United States Patent
Hanes et al.

(10) Patent No.: US 9,542,304 B1
(45) Date of Patent: Jan. 10, 2017

(54) AUTOMATED OPERATING SYSTEM INSTALLATION

(71) Applicant: AMERICAN MEGATRENDS, INC., Norcross, GA (US)

(72) Inventors: Charles Patrick Hanes, Hoschton, GA (US); Clas Gerhard Sivertsen, Lilburn, GA (US); James Brian Richardson, Loganville, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/948,659

(22) Filed: Jul. 23, 2013

Related U.S. Application Data (63) Continuation of application No. 12/575,825, filed on Oct. 8, 2009, now Pat. No. 8,495,626.

(51) Int. Cl.
*G06F 9/445* (2006.01)
*G06F 11/36* (2006.01)

(52) U.S. Cl.
CPC ................................. *G06F 11/3688* (2013.01)

(58) Field of Classification Search
None
See application file for complete search history.

(56) References Cited

U.S. PATENT DOCUMENTS

| | | | |
|---|---|---|---|
| 5,325,377 A * | 6/1994 | Tuttle ............................. | 714/819 |
| 5,410,551 A * | 4/1995 | Edwards et al. ............... | 714/736 |
| 5,581,740 A | 12/1996 | Jones | |
| 6,094,531 A * | 7/2000 | Allison et al. ................. | 717/176 |
| 6,178,503 B1 | 1/2001 | Madden et al. | |
| 6,532,538 B1 * | 3/2003 | Cronk et al. ....................... | 713/2 |
| 6,543,047 B1 * | 4/2003 | Vrhel et al. .................... | 717/121 |
| 6,618,857 B1 | 9/2003 | Zimniewicz et al. | |
| 6,871,244 B1 * | 3/2005 | Cahill et al. .................... | 710/62 |
| 7,039,836 B2 | 5/2006 | Powers et al. | |
| 7,290,258 B2 | 10/2007 | Steeb et al. | |
| 7,356,677 B1 | 4/2008 | Rafizadeh | |
| 7,467,283 B2 | 12/2008 | Loffink et al. | |
| 7,614,050 B2 | 11/2009 | Sasaki et al. | |
| 2001/0012986 A1 | 8/2001 | Conan et al. | |

(Continued)

OTHER PUBLICATIONS

U.S. Appl. No. 12/814,873, filed Jun. 14, 2010, entitled "Virtual Disk Carousel," Inventors: Richardson et al.

(Continued)

*Primary Examiner* — Isaac T Tecklu
*Assistant Examiner* — Daxin Wu
(74) *Attorney, Agent, or Firm* — Meunier Carlin & Curfman LLC (57) ABSTRACT

Technologies are provided herein for automated operating system installation. Through the concepts and technologies presented herein, the process of installing multiple operating systems on a system under test ("SUT") can be automated and monitored, thereby permitting the unattended installation of the operating systems. Multiple operating systems can be installed and errors detected during the installations can be logged in an automated fashion, thereby reducing the cost of such testing. Errors generated during the automated installation process can be analyzed and utilized to identify and correct errors in a computing system firmware. A device selector for facilitating the automated installation process is also provided.

6 Claims, 8 Drawing Sheets

(56) References Cited

U.S. PATENT DOCUMENTS

| | | |
|---|---|---|
| 2004/0098244 A1 | 5/2004 | Dailey et al. |
| 2004/0117414 A1 | 6/2004 | Braun et al. |
| 2004/0194084 A1 | 9/2004 | Matsunami et al. |
| 2004/0210888 A1 | 10/2004 | Bergen et al. |
| 2004/0267482 A1* | 12/2004 | Robertson et al. ........... 702/118 |
| 2005/0149682 A1 | 7/2005 | Kim |
| 2005/0216481 A1 | 9/2005 | Crowther et al. |
| 2006/0013100 A1 | 1/2006 | Ho |
| 2006/0047946 A1 | 3/2006 | Keith, Jr. |
| 2006/0129797 A1 | 6/2006 | Durfee et al. |
| 2006/0174049 A1 | 8/2006 | Lin et al. |
| 2006/0251087 A1 | 11/2006 | Ng et al. |
| 2007/0050750 A1 | 3/2007 | Bykov et al. |
| 2007/0239861 A1 | 10/2007 | Reeves et al. |
| 2008/0010631 A1 | 1/2008 | Harvey et al. |
| 2008/0126773 A1 | 5/2008 | Martinez et al. |
| 2008/0134171 A1 | 6/2008 | Matsunami et al. |
| 2008/0141242 A1* | 6/2008 | Shapiro ........................ 717/174 |
| 2008/0189398 A1 | 8/2008 | Solyanik |
| 2008/0256219 A1 | 10/2008 | Zhang et al. |
| 2008/0320071 A1 | 12/2008 | Hoskins et al. |
| 2009/0019211 A1* | 1/2009 | Bandholz et al. ............ 711/103 |
| 2009/0063765 A1 | 3/2009 | Kottomtharayiul et al. |
| 2009/0199193 A1 | 8/2009 | Jackson |
| 2009/0307477 A1 | 12/2009 | Matthew et al. |
| 2009/0307763 A1 | 12/2009 | Rawlins et al. |
| 2010/0192145 A1 | 7/2010 | Liles et al. |
| 2011/0004872 A1 | 1/2011 | Eromenko et al. |

OTHER PUBLICATIONS

El Torito (CD-ROM standard), Wikipedia, first issued in Jan. 1995 as a joint proposal by IBM and BIOS Manufacturer Phoenix Technologies, 2 pages.

Hachman, Mark, et al., "Meet 'Facet,' the RealNetworks DVD Ripper Box," pcmag.com, Apr. 28, 2009, 1 page.

TeraCart Multimedia Storage System, Blu-ray Disc, Asaca Shibasoku Corporation of America, 2007, 2 pages.

Virtual CD-ROM Control Panel 2.0.11, Softpedia, 1 page.

\* cited by examiner

Fig. 7

AUTOMATED OPERATING SYSTEM INSTALLATION

BACKGROUND

Most computing systems utilize firmware to control their low-level operation. In many computing systems, the firmware provides functionality for performing a power-on self-test ("POST") of the computing system, for performing an initial program load, or boot, of the computing system, for providing interfaces to the low-level operation of the computing system hardware to an operating system, and for performing other functions. Because the firmware controls the low-level operation of a computing system, it is imperative that the firmware operates without program errors, sometimes called "bugs." Because of the complexity of most computing system firmware, however, this type of software can be very difficult to test and debug.

One commonly used mechanism for testing the operation of a computing system firmware involves installing an operating system on a computer system under test ("SUT"). If errors are detected during the installation of the operating system, the errors can be utilized to identify bugs within the computing system firmware. This process is typically repeated for many different operating systems and, potentially, many different versions of the computing system firmware. There are cases where slight variations in task completion time, or other timing problems or delays could cause installations to fail. Therefore, it is also useful to test the identical operating system installation multiple times; something that might be referred to as "burn-in" testing. Because this testing process is typically performed manually by a human operator, however, this process can be extremely time consuming, costly, and prone to human errors due to the often repetitive nature of these tasks.

It is with respect to these and other considerations that the disclosure presented herein has been made.

SUMMARY

Technologies are provided herein for automated operating system installation. Through the concepts and technologies presented herein, the process of installing operating systems on a SUT can be automated, thereby permitting the unattended installation of the operating systems. Multiple operating systems can be installed and errors detected during the installations can be logged in an automated fashion, thereby reducing the cost of such testing.

According to one aspect presented herein, a device selector is provided that includes functionality for selectively connecting a single mass storage device to a SUT. The device selector receives commands from a test control system ("TCS") to connect a specified mass storage device to the SUT. In one implementation, the device selector includes a universal serial bus ("USB") hub for connection to the SUT and two or more multiplexers, each of the multiplexers configured for connection to two or more mass storage devices. The device selector also includes a USB-to-serial device for connection to the TCS and the multiplexers. The USB-to-serial device receives a control signal from the TCS and configures the multiplexers based upon the control signal to establish a connection between one mass storage device and the USB hub, thereby enabling a connection between the selected mass storage device and the SUT.

According to another aspect, a TCS is provided that is configured with software for coordinating the automated installation of multiple operating systems on the SUT. In one embodiment, the TCS includes executable scripts for coordinating the automated installation of the operating systems. The TCS is connected to the device selector. Through the scripts and the functionality provided by the device selector, the TCS can configure a connection between a single mass storage device, such as a CD-ROM or DVD-ROM drive, and the SUT. The mass storage devices include computer-readable storage media that includes the installer programs for the operating systems to be installed on the SUT. One of the mass storage devices includes a computer-readable storage media containing a disk drive utility program that includes functionality for erasing or formatting a mass storage device and for creating an image of a mass storage device.

In order to install an operating system on the SUT, the SUT is first configured to boot from an external mass storage device. For instance, the firmware of the SUT may be configured to boot from a CD-ROM or a DVD-ROM drive. Once the SUT has been so configured, the scripts executing on the TCS cause the device selector to connect a mass storage device to the SUT that contains an installer program for a first operating system to be installed on the SUT. The TCS then causes the SUT to power on, such as through the use of a power controller or a keyboard, video, and mouse over Internet protocol ("KVM/IP") redirection device. When the SUT boots up, the SUT then executes the installer program for the first operating system.

While the SUT is installing an operating system, the TCS receives screen displays (referred to herein simply as "screens") generated by the SUT from a KVM/IP redirection device connected to the SUT. The TCS then compares screens received from the SUT to previously generated and stored screens generated during an error-free installation of the operating system. Through the comparison process, the TCS can determine if an error has occurred during the installation of the operating system on the SUT. If an error occurs during installation, the TCS stores data identifying the error in an error log. A screen generated by the SUT at or around the time of the error may also be stored. In one embodiment, the TCS can also provide keystrokes to the SUT to facilitate the installation of an operating system. The keystrokes may be provided to the SUT through the use of a KVM/IP redirection device. An analysis of the received screens can be performed to determine when a particular key press should be provided to the SUT.

The TCS also compares screens received from the SUT to previously generated and stored screens to determine if the installation of the first operating system on the SUT has completed. If the installation has completed, the TCS causes the SUT to power off and causes the device selector to connect a second mass storage device to the SUT. The second mass storage device contains a computer-readable storage media that contains a disk drive utility program providing functionality for erasing or formatting a mass storage device and for creating an image of the mass storage device. The TCS then causes the SUT to power on. When the SUT powers on, it executes the disk drive utility program. The disk drive utility program creates and stores an image of the installation of the first operating system. The disk utility also formats the mass storage device upon which the first operating system was installed, thereby preparing the mass storage device for installation of a second operating system.

When the disk utility has completed execution, the TCS powers off the SUT, configures the device selector to connect a mass storage device containing an installer program for a second operating system to the SUT, and powers on the SUT. The SUT then executes the installer program for the second operating system and monitors the installation of the second operating system in the manner presented above. This process may then be repeated for any number of operating systems, thereby allowing multiple operating systems to be installed in an automated fashion. When all of the operating systems have been installed, an electronic mail message may be generated to an administrator that includes the error log and screens showing any errors encountered during the installation of any of the operating systems.

It should be appreciated that the error log, screens, and images of installed operating systems may be utilized to debug the operation of a firmware executing on the SUT. For instance, bugs in the firmware may be identified through an analysis of the error log, screens generated by the SUT, or the images of the operating system installation. Once a bug has been identified, an appropriate bug fix may be applied to the firmware. The tests described above may then be repeated on the revised firmware to determine if the problem has been resolved.

It should also be appreciated that while the various embodiments presented herein are described in the context of the installation of an operating system, the concepts and technologies presented herein may be applied to monitoring the execution of any type of program code. It should be further appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for automated operating system installation. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
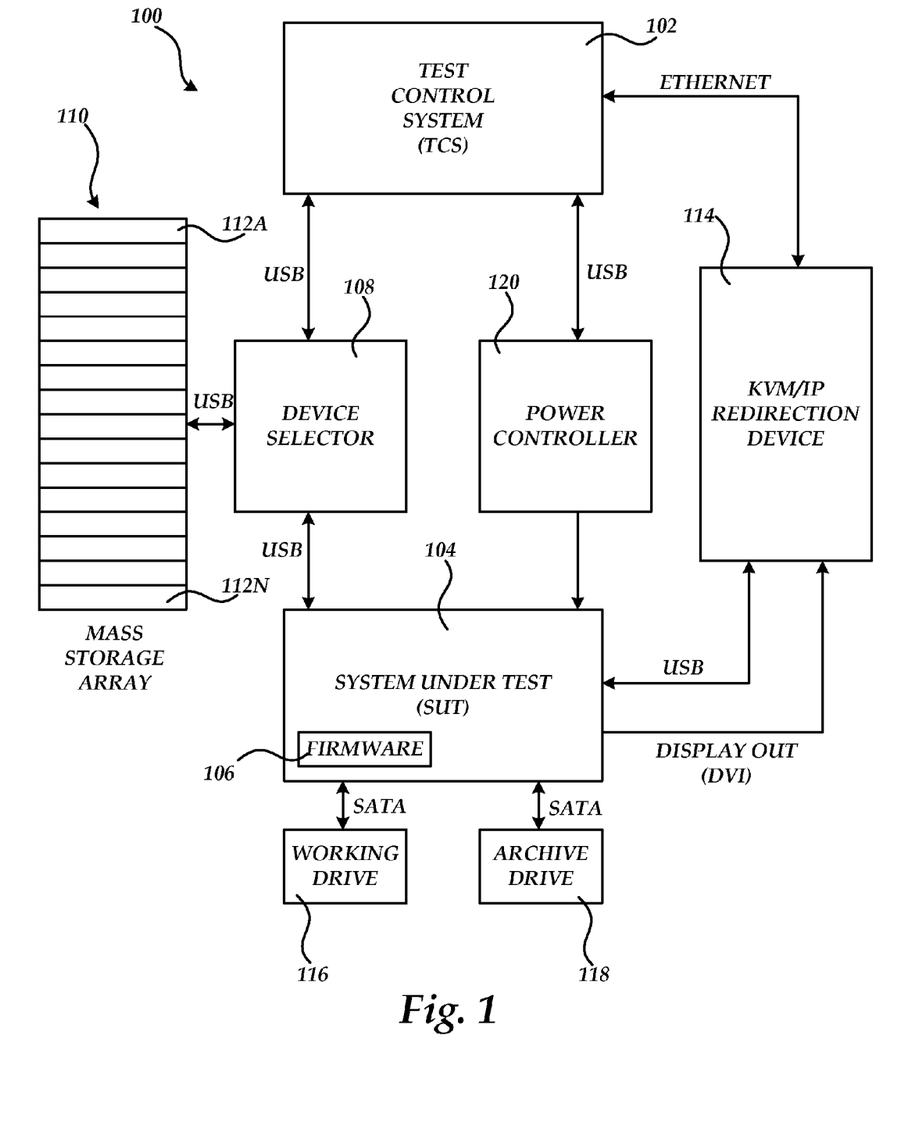
FIG. 1 is a system diagram showing aspects of a system provided in one embodiment for automated operating system installation.

FIG. 1 is a system diagram showing aspects of a system 100 provided in one embodiment for automated operating system installation. The system 100 shown in FIG. 1 includes a test control system ("TCS") 102. As will be described in detail herein, the TCS 102 is configured with executable program code for automating the installation of one or more operating systems on a system under test ("SUT") 104. Through the functionality provided by the TCS 102 according to the various embodiments presented herein, multiple operating systems may be installed on the SUT 104 in an automated fashion. Errors detected during the installation of the operating systems may be logged and utilized to debug a firmware 106 of the SUT 104. Additional details regarding this process and other processes disclosed herein will be provided below with respect to FIGS. 2-6.

In order to automate the installation of operating systems on the SUT 104, the TCS 102 operates in conjunction with the device selector 108. As illustrated in FIG. 1, the device selector 108 is connected to one or more mass storage devices 112A-112N. In one embodiment, the mass storage devices 112A-112N are presented in a mass storage array 110. It should be appreciated, however, that the mass storage devices 112A-112N may be standalone devices connected to the device selector 108 in an individual fashion.

According to implementations, the TCS 102 includes a connection to the device selector 108. The connection to the device selector 108 can be utilized by the TCS 102 for selecting a single one of the mass storage devices 112A-112N for connection to the SUT 104. In this manner, the TCS 102 can specify which of the mass storage devices 112A-112N that should be connected to the SUT 104 under programmatic control. Additional details regarding the construction and use of the device selector 108 will be provided below with respect to FIGS. 2-6.

According to one implementation, the TCS 102 also operates in conjunction with a power controller 120. As illustrated in FIG. 1, a connection is provided between the TCS 102 and the power controller 120. Another connection is also provided between the power controller 120 and the SUT 104. Through the appropriate connection, the TCS 102 can instruct the power controller 120 to power on the SUT 104. Additionally, the TCS 102 can instruct the power controller 120 to power off the SUT 104. Additional details regarding the use of the power controller 120 in the various embodiments presented herein for automating the installation of operating systems will be provided below with respect to FIGS. 2-6.

As shown in FIG. 1, the TCS 102 also utilizes a keyboard, video, mouse/internet protocol ("KVM/IP") redirection device 114. As illustrated in FIG. 1, a video display output of the SUT 104 is connected to the KVM/IP redirection device 114. Additionally, a connection is made between the KVM/IP redirection device 114 and the SUT 104 through which the KVM/IP redirection device 114 can send keyboard and mouse signals to the SUT 104. In one embodiment, this connection is a universal serial bus ("USB") connection. It should be appreciated, however, that other types of connections, such as a PS/2 mouse and keyboard connector may be utilized. The KVM/IP redirection device 114 is also connected to the TCS 102 through an appropriate network connection, such as an Ethernet connection.

As known to those skilled in the art, the KVM/IP redirection device 114 includes functionality for capturing screen displays generated by the SUT 104, compressing the screen displays, and transmitting the screen displays to the TCS 102. The KVM/IP redirection device 114 also includes functionality for receiving commands from the TCS 102 to provide keyboard or mouse input to the SUT 104. In response to receiving such instructions, the KVM/IP redirection device 114 is configured to provide the specified keyboard or mouse input to the SUT 104. In this manner, the programs described herein as executing on the TCS 102 can receive screens generated by the SUT 104 and provide keyboard and mouse input to the SUT 104. In one embodiment, the KVM/IP redirection device 114 also provides functionality for powering the SUT 104 on and off under the control of the TCS 102. In this embodiment, the power controller 120 may be unnecessary.

According to another implementation, a combination of components might be utilized to provide similar functionality to the KVM/IP redirection device 114. For instance, in one embodiment, a Keyboard and Mouse Emulator (not shown) might be utilized to provide keyboard and mouse input to the SUT 104 in response to commands received from the TCS 102. In one implementation, the Keyboard and Mouse Emulator connects to the SUT 104 using a USB interface and connects to the TCS 102 utilizing an RS-232 interface. A Frame Grabber (also not shown in FIG. 1), might also be utilized to capture screen displays from the SUT 104 and to provide the captured screen displays to the TCS 102. The Frame Grabber might connect to video output of the SUT 104, such as a DVI output, and provide the captured screen displays to the TCS 102 via a USB connection. It should be appreciated that other and different arrangements of components might also be utilized to provide the functionality described above.

As briefly described above, the SUT 104 comprises a computer system that includes a firmware 106. As discussed briefly above, the firmware 106 provides functionality for performing a power on self test of the SUT 104, for performing a boot of the SUT 104, for providing interfaces to the low level operation of the SUT 104 to an operating system, and for performing other functions. Because the firmware 106 controls the low level operation of the SUT 104, it is imperative that the firmware 106 operates without program errors. The process described herein for automating the installation of operating systems on the SUT 104 may be utilized to identify errors within the firmware 106. Once such errors have been identified, the firmware 106 can be modified to correct the errors and the processes described herein may be repeated until an error-free installation has been performed.

As will be described in greater detail below, the SUT 104 may include conventional computing components, such as a central processing unit, a memory, and one or more mass storage devices. In one implementation, the SUT 104 includes two hard disk drives. In particular, a working drive 116 is provided upon which an operating system for use in booting the SUT 104 is installed by the processes presented herein. An archive drive 118 is also provided. As will be discussed in greater detail below, the archive drive 118 is utilized to store images of operating system installations. The images of the operating system installations may also be utilized to debug the operation of the firmware 106. It should be appreciated that although the working drive 116 and the archive drive 118 have been discussed above as hard disk drives, other types of mass storage devices, such as solid state mass storage devices may be utilized.

As will be discussed in greater detail below, the TCS 102 may control an automated installation of an operating system on the SUT 104. In order to facilitate this process, the firmware 106 of the SUT 104 is configured to boot from an external mass storage device, such as a CD-ROM or a DVD-ROM drive. Once the SUT 104 has been so configured, the program code executing on the TCS 102 causes the device selector 108 to connect one of the mass storage devices 112A-112N to the SUT 104. The connected mass storage device includes an installer program for a first operating system to be installed on the SUT 104. The TCS 102 then causes the SUT 104 to power on, such as through the use of the power controller 120 or the KVM/IP redirection device 114. When the SUT 104 boots up, it executes the installer program for the first operating system contained on the selected mass storage device 112A-112N.

While the SUT 104 is installing an operating system, the TCS 102 receives screens generated by the SUT 104 from the KVM/IP redirection device 114. The TCS 102 then compares the screens received from the SUT 104 to previously stored screens generated during an error-free installation of the operating system. Through this comparison process, the TCS 102 can determine if an error has occurred during installation of the operating system on the SUT 104. If an error occurs during the installation, the TCS 102 stores data identifying the error in an error log. A screen display generated by the SUT 104 at or around the time of the error may also be stored by the TCS 102. In one implementation, the TCS 102 can also provide keystrokes to the SUT 104 to facilitate the installation of an operating system. The keystrokes may be provided to the SUT through the use of the KVM/IP redirection device 114 in the manner described above. The TCS 102 may perform an analysis of the screens received from the SUT 104 to determine when a particular key press should be provided to the SUT 104. In a similar fashion, the TCS 102 may provide mouse input to the SUT 104 to control the installation of an operating system.

The TCS 102 also compares screens received from the SUT 104 to previously generated and stored screens to determine if the installation of the operating system on the SUT has completed. If the installation has completed, the TCS 102 causes the SUT 104 to power off through the use of the power controller 120 or the KVM/IP redirection device 114. The TCS 102 then causes the device selector 108 to connect a second mass storage device 112A-112N to the SUT 104. In one implementation, the selected mass storage device contains a computer-readable storage media that contains a disk drive utility program providing functionality for erasing or formatting a mass storage device and for creating an image of the mass storage device. Once such a mass storage device 112A-112N has been selected, the TCS 102 causes the SUT 104 to power on. When the SUT 104 powers on, it executes the disk drive utility program. The disk drive utility program creates and stores an image of the installation of the first operating system. For instance, the disk drive utility may create an image of the working drive 116 and store the created image on the archive drive 118. The disk utility also formats the mass storage device upon which the first operating system was installed, such as the working drive 116, thereby preparing the mass storage device for installation of a second operating system.

When the disk utility has completed execution on the SUT 104, the TCS 102 powers off the SUT 104, causes the device selector 108 to select one of the mass storage devices 112A-112N containing an installer program for a second operating system, and monitors the installation of the second operating system on the SUT 104 in the manner presented above. This process may then repeated for any number of operating systems, thereby allowing multiple operating system to be installed on the SUT 104 in an automated fashion. When all of the operating systems have been installed, the TCS 102 may generate an electronic mail message to an administrator that includes the error log and screens showing any errors encountered during the installation of any of the operating systems.

According to embodiments, the generated error log, screens, and images of installed operating systems stored on the archive drive 118 may be utilized to debug the operation of the firmware 106 executing on the SUT 104. For instance, bugs in the firmware 106 may be identified through an analysis of the error log, screens, and operating system installation images. Once a bug has been identified, an appropriate bug fix may be applied to the firmware 106. The test described above may then be repeated on the revised firmware to determine if the problem has been resolved.

It should be appreciated that although specific types of connections have been illustrated in FIG. 1 between the various components of the system 100, other types of connections may also be utilized. For instance, USB connections have been illustrated between the device selector 108 and the TCS 102, the mass storage array 110 and the SUT 104. It should be appreciated that other types of wired or wireless connections suitable for connecting a mass storage device to a computing system may be utilized. Similarly, although SATA interfaces have been illustrated as being utilized for connecting the SUT 104 to the working drive 116 and the archive drive 118, other types of appropriate interfaces for connecting a mass storage device to a computing system may be utilized. It should be appreciated that the embodiments described herein are not limited by the particular interfaces described herein with respect to any embodiment.

Figure 2:
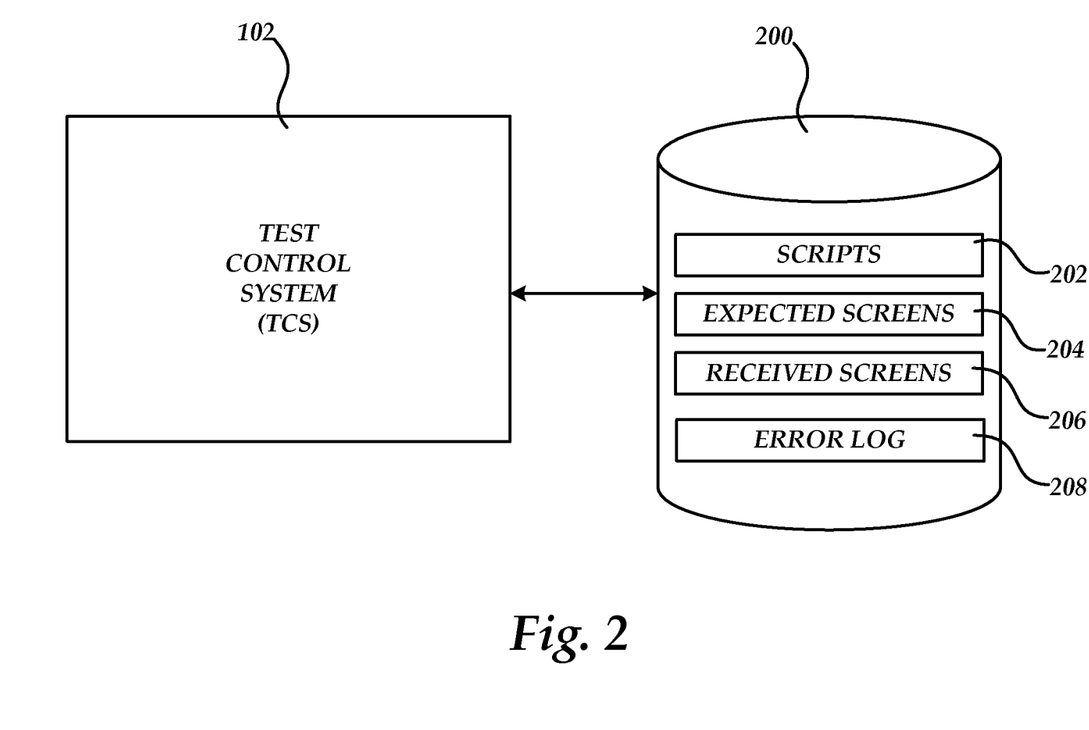
FIG. 2 is a simplified computer system architecture diagram showing aspects of a test control system provided in one embodiment disclosed herein.

FIG. 2 is a simplified computer system architecture diagram showing aspects of a test control system 102 provided in one embodiment disclosed herein. As shown in FIG. 2, the TCS 102 includes a mass storage device 200. The mass storage device 200 is utilized to store an operating system and executable programs for use by the TCS 102 in coordinating the process of automated operating system installation. In particular, in one embodiment, the mass storage device 200 stores scripts 202. The scripts 202 are configured to provide the functionality presented herein for automating the process of installing an operating system on the SUT 104. It should be appreciated that although the embodiments presented herein utilize scripts 202, virtually any type of executable computer program may be configured for providing the functionality described herein. For instance, a standard application program may be programmed for execution on the TCS 102 that provides the functionality described herein.

According to embodiments, the mass storage device 200 also stores the expected screens 204 and received screens 206. The received screens 206 are screen displays generated by the SUT 104 and transmitted to the TCS 102 by the KVM/IP redirection device 114. The expected screens 204 are captured and stored during an error-free installation of an operating system on the SUT 104 or another computer system. As discussed briefly above and in greater detail below, the scripts 202 compare the received screens 206 to the expected screens 204 to determine if an error has occurred during the installation of an operating system on the SUT 104. It should be appreciated that expected screens 204 may be stored for all of the operating systems to be installed on the SUT 104. Additionally, in one embodiment, expected screens are stored for the disk drive utility program described herein in order to determine whether that program has executed correctly and to control the operation of that program. Additional details regarding this process will be provided below.

According to one implementation, the mass storage device 200 also stores an error log 208. As described briefly above, the scripts 202 store data in the error log 208 in the event that an error is identified during the installation of an operating system on the SUT 104. The data stored in the error log 208 may provide various information such as the kind of error encountered, the time the error was encountered, and other parameters regarding the operating system installation on the SUT 104. As discussed briefly above, the scripts 202 may generate an electronic mail message with the error log 208 to an administrator to notify the administrator that an error has occurred during the installation of an operating system on the SUT 104. The TCS 102 may also make the error log 208 available to the administrator in other ways. Additional details regarding the operation of the scripts 202 and the TCS 102 will be provided below with respect to FIGS. 3-6.

Figure 3:
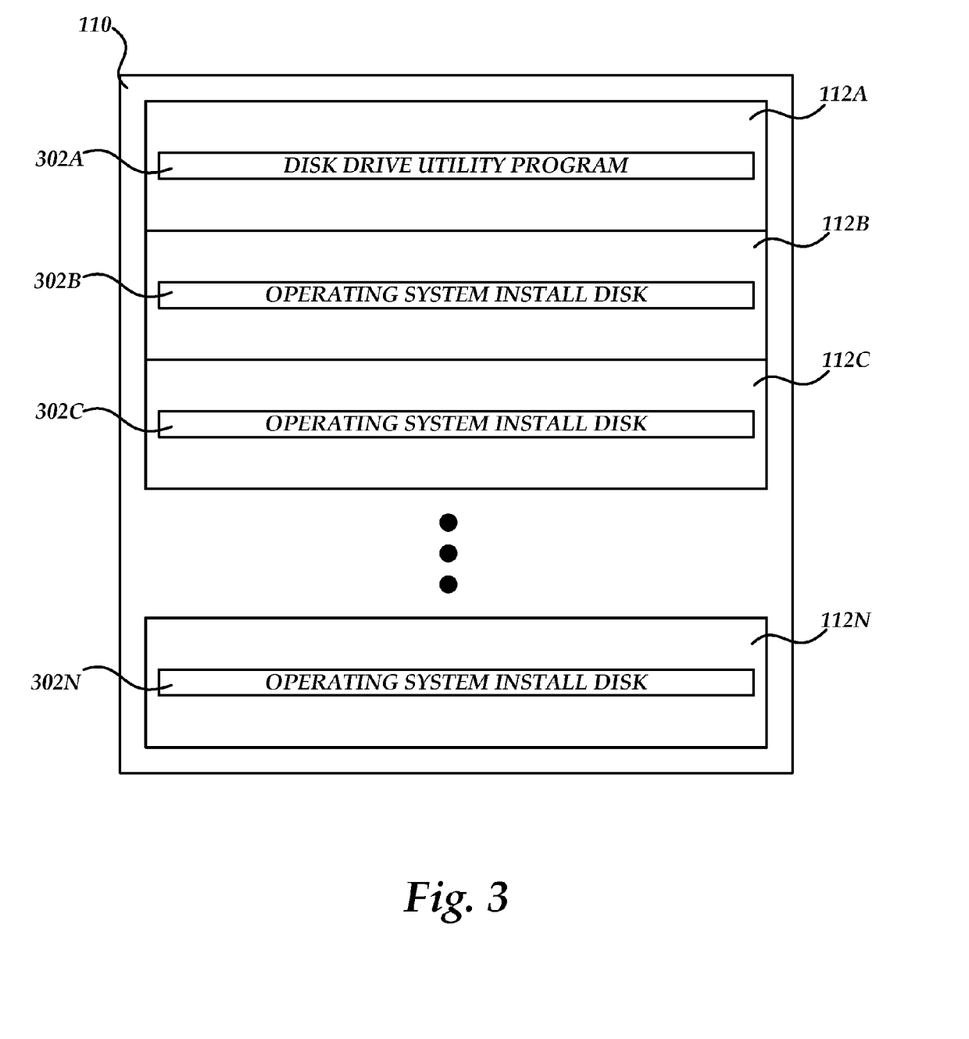
FIG. 3 is a system diagram showing aspects of a mass storage array utilized in one embodiment presented herein.

FIG. 3 is a system diagram showing aspects of a mass storage array 110 utilized in one embodiment presented herein. As illustrated in FIG. 3, the mass storage array 110 includes a number of mass storage devices 112A-112N. As discussed above, the mass storage devices 112A-112N may comprise optical mass storage devices, such as CD-ROM drives or DVD-ROM drives. According to other embodiments, the mass storage devices 112A-112N may comprise solid state mass storage devices. Other types of mass storage devices may also be utilized.

According to one embodiment, one of the mass storage devices 112A-112N is configured with a disk drive utility program 302A. As discussed briefly above, the disk drive utility program 302A is configured with functionality for erasing or formatting a mass storage device. The disk drive utility program 302A is also configured with functionality for taking an image of a mass storage device. In one embodiment, the disk drive utility program 302A is utilized to create images of the working drive 116 following the installation of an operating system thereupon. The images are stored on the archive drive 118 in one embodiment, although the images may also be stored in another location. The disk drive utility program 302A is also configured with functionality for formatting or erasing the working drive 116 following the creation of an image of the operating system installation. In this manner, the disk drive utility program 302A can be utilized to prepare the working drive 116 for the installation of another operating system.

According to embodiments, other of the mass storage devices 112A-112N are configured with installer programs for the operating systems to be installed on the SUT 104. For instance, computer-readable storage media may be utilized in conjunction with the mass storage devices 112B-112N. As an example, operating system install disks 302B, 302C, and 302N may be configured for use with the mass storage devices 112B-112N. In the case of optical mass storage devices, the operating system install disks 302B, 302C, 302N may comprise optical media. In the case of solid state mass storage devices 112B-112N, the operating system install disks 302B, 302C, and 302N may comprise images of an operating system installation disk suitable for use with a solid state mass storage device. As discussed above, a device selector 108 is utilized by the TCS 102 to cause one of the mass storage devices 112A-112N to be connected to the SUT 104. The SUT 104 then boots and executes the computer-readable storage media contained within the selected mass storage device 112A-112N. Additional details regarding this process will be provided below with respect to FIGS. 4-6.

Figure 4:
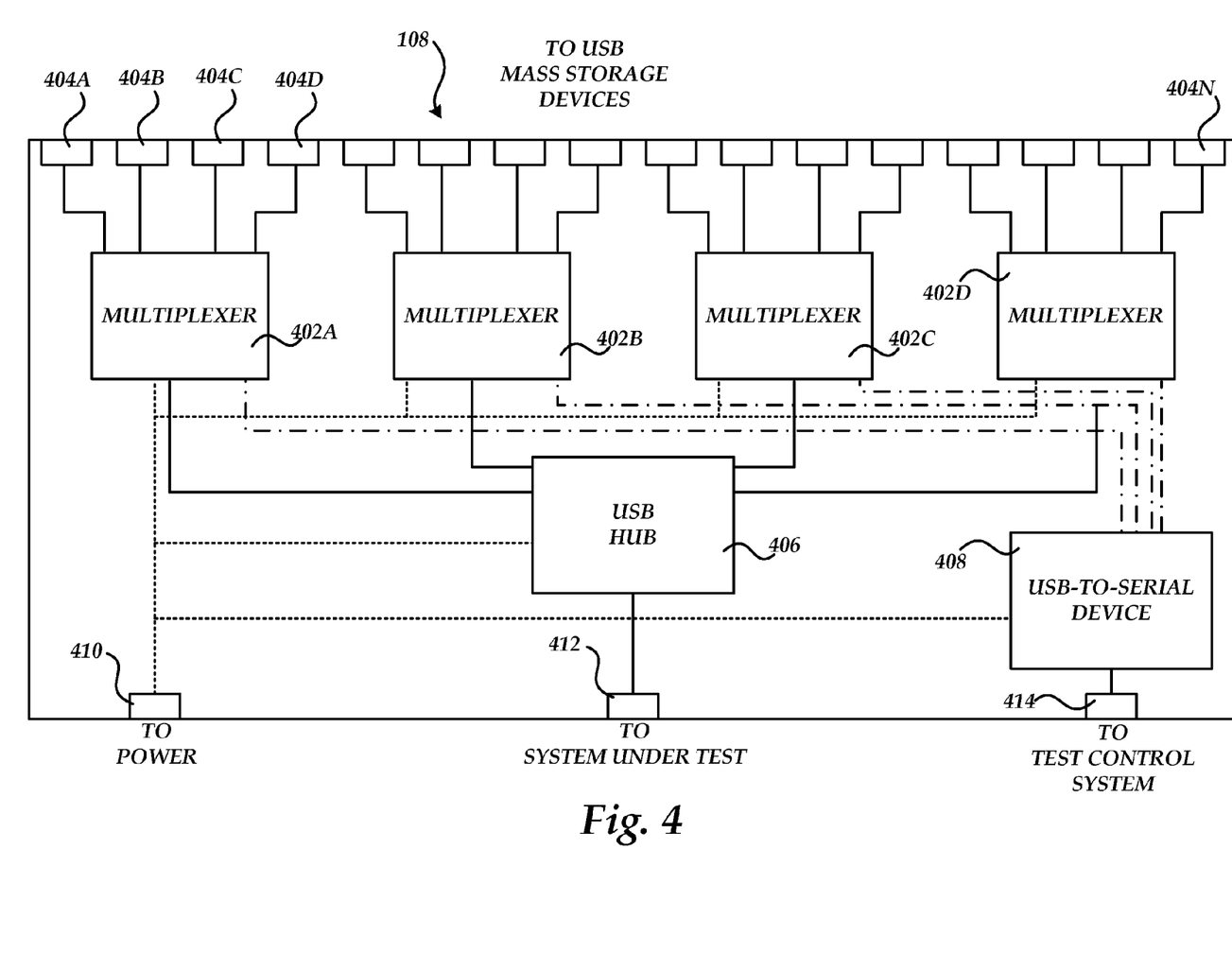
FIG. 4 is a simplified computer system architecture diagram showing aspects of a device selector provided in one embodiment disclosed herein.

FIG. 4 is a simplified computer system architecture diagram showing aspects of a device selector 108 provided in one embodiment disclosed herein. As shown in FIG. 4, the device selector 108 includes a USB hub 406 that is connected to one or more multiplexers 402A-402D. In the example shown in FIG. 4, the USB hub 406 is connected to four multiplexers 402A-402D. As shown in FIG. 4, each of the multiplexers 402A-402D is connected to four external USB ports. For instance, the multiplexer 402A is connected to the USB ports 404A-404D. In this manner, the configuration shown in FIG. 4 can enable the connection of up to 16 mass storage devices to the SUT 104. It should be appreciated that other configurations may permit the connection of more or fewer mass storage devices to the SUT 104.

As known to those skilled in the art, the multiplexers 402A-402D are configured to respond to a control signal for selecting one of the USB ports 404A-404D. The selected one of the USB ports is then connected to the USB hub 406. In one implementation, a USB-to-serial device 408 is connected to the TCS 102. The USB-to-serial device 408 receives a control signal from the TCS 102 for selecting one of the USB ports from one of the multiplexers 402A-402D for connection to the USB hub 406. When such a selection is made, the USB hub 406 causes signals from the selected USB port to be routed to the output port 412 connected to the SUT 104. In this manner any one of the USB ports 404A-404N connected to the mass storage devices 112A-112N can be connected to the SUT 104. As illustrated in FIG. 4, the device selector 108 also includes an appropriate power input port 410 for providing a power signal to the multiplexers 402A-402D, the USB hub 406, and the USB-to-serial device 418. As discussed above, it should be appreciated that although the device selector 108 is described herein as being utilized with USB mass storage devices, other appropriate interfaces for connecting a mass storage device to a computing system may be utilized. For instance, the device selector 108 may be configured appropriately for use with the FIREWIRE mass storage device communications standard. Additional details regarding the use of the device selector 108 by the TCS 102 will be provided below with respect to FIGS. 5A-5B.

Figure 5A:
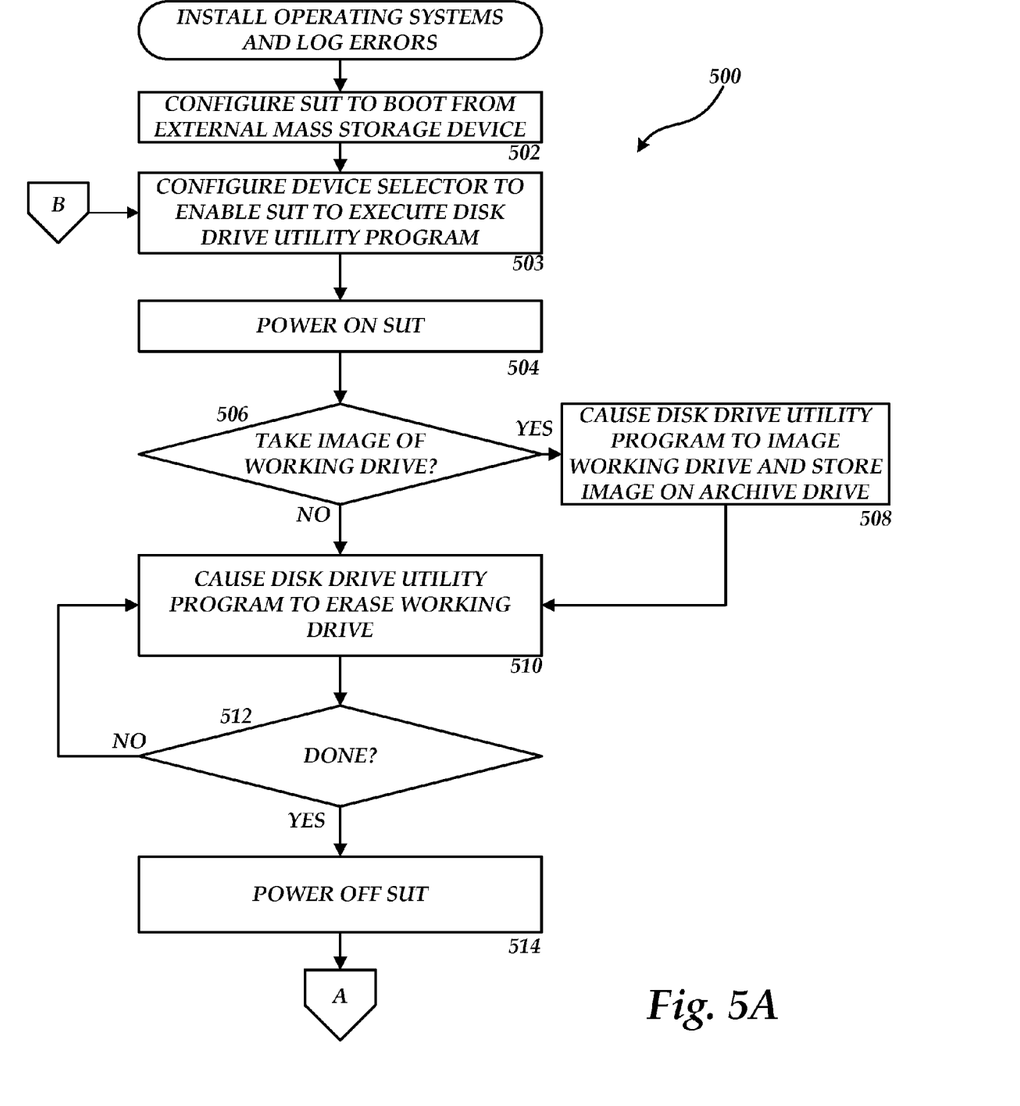
FIGS. 5A and 5B are flow diagrams showing aspects of one process presented herein in an embodiment for the automated installation of operating systems.
Figure 5B:
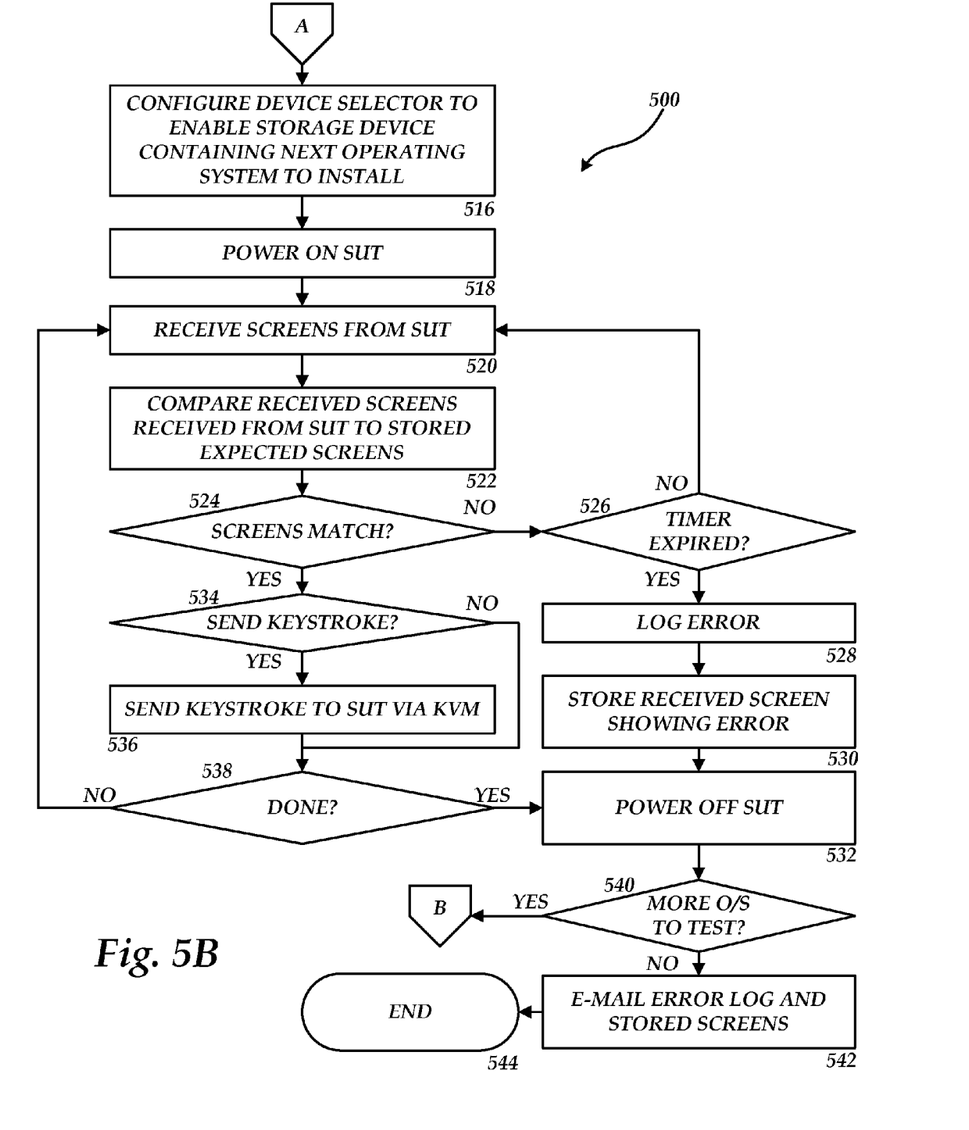

FIGS. 5A and 5B are flow diagrams showing aspects of one process presented herein in an embodiment for the automated installation of operating systems. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the SUT 104 is configured to boot from an external mass storage device, such as one of the mass storage devices 112A-112N. From operation 502, the routine 500 process to operation 503, where the TCS 102 configures the device selector 108 to enable the SUT 104 to execute the disk drive utility program 302A. In this regard, the TCS 102 may configure the device selector 108 to enable the SUT 104 to communicate with one of the mass storage devices 112A-112N that contains the disk drive utility 302A.

Once the device selector 108 has been configured to enable the SUT 104 to execute the disk drive utility 302A, the routine 500 proceeds to operation 504 wherein the TCS 102 powers on the SUT 104. As discussed above, the TCS 102 may utilize the power controller 120 or the KVM/IP redirection device 114 to power on the SUT 104. In response to being powered on, the SUT 104 boots the disk drive utility 302A. When the disk drive utility 302A is booted and executed by the SUT 104, the disk drive utility 302A determines whether it should take an image of the working drive 116. An image of the working drive 116 should be taken following the installation of each of the operating systems to be tested with the SUT 104. In this regard, if an image is to be taken of the working drive 116, the routine 500 proceeds from operation 506 to operation 508. At operation 508, the TCS 102 causes the disk drive utility program 302A to prepare an image of the working drive 116 and to store the image on the archive drive 118. From operation 508, the routine 500 proceeds to operation 510.

If at operation 506, it is determined that it is unnecessary to take an image of the working drive 116, the routine 500 proceeds from operation 506 to operation 510. At operation 510, the TCS 102 causes the disk drive utility 302A program executing on the SUT 104 to erase the working drive 116. For instance, in one embodiment, the disk drive utility may erase the master boot record ("MBR") on the working drive 116 in order to prepare the working drive 116 for the installation of another operating system. Once the working drive 116 has been prepared for installation of the next operating system, the routine 500 proceeds from operation 512, to operation 514.

At operation 514, the TCS 102 powers off the SUT 104 utilizing the power controller 120 or the KVM/IP redirection device 114. The routine 500 then proceeds from operation 514 to operation 516 where the TCS 102 configures the device selector 108 to enable one of the mass storage devices containing the next operating system to be installed on the SUT 104 to be connected to the SUT 104. Once the appropriate mass storage device 112A-112N has been selected utilizing the device selector 108, the routine 500 proceeds to operation 518 where the TCS 102 causes the SUT 104 to be powered on. When the SUT 104 is powered on, it will begin installing the operating system installer program from the selected mass storage device 112A-112N and begin the process of installing the second operating system on the SUT 104. During the installation of the operating system, the KVM/IP redirection device 114 will receive screens from the SUT 104 and transmit the screens to the TCS 102. The TCS 102 receives the screens from the KVM/IP redirection device 114 at operation 520. From operation 520, the routine 500 proceeds to operation 522 where the TCS 102 compares the screens 206 received from the KVM/IP redirection device 114 to the expected screens 204.

At operation 524, a determination is made if the expected screens 204 match the received screens 206. If not, the routine 500 proceeds to operation 526, where the TCS 102 determines whether a timer has expired. If not, the routine 500 returns to operation 520 where an additional determination is made. The use of a timer in this manner allows the TCS 102 to wait a predetermined period of time before concluding that an error has occurred during the installation of an operating system on the SUT 104. This can be utilized to account for timing differences in the speed at which an operating system may be installed on different systems having varying level of performance.

If the timer has expired at operation 526, the routine 500 proceeds to operation 528 where the TCS 102 makes a record of the error in the error log 208 in the manner described above. The routine 500 then proceeds to operation 530 where the TCS 102 stores the received screen 206 showing the error in the installation of the operating system on the SUT 104.

If, at operation 524, the scripts 202 executing on the TCS 102 determine that the expected screens 204 match the received screens 206, the routine 500 proceeds from operation 524 to operation 534. At operation 534, the scripts 202 determine whether one or more keystrokes should be sent to the SUT 104 in order to facilitate the installation of the operating system on the SUT 104. If no keystrokes are to be sent to the SUT 104, the routine 500 proceeds from operation 534 to operation 538. If keystrokes are to be sent to the SUT 104, the routine 500 proceeds from operation 534 to operation 536 where the TCS 102 sends the appropriate keystrokes to the KVM/IP redirection device 114 for provision to the SUT 104. It should be appreciated that the keystrokes to be sent to the SUT 104 may be determined through an analysis of an error-free installation of an operating system on the SUT 104. It should also be appreciated that mouse input may be transmitted to the SUT 104 in a similar manner to facilitate installation of an operating system on the SUT 104.

From operation 536, the routine 500 proceeds to operation 538 where the scripts 202 determine whether the installation of the operating system on the SUT 104 has completed. This may be accomplished, for instance, by comparing the expected screens 204 to the received screens 206 to determine whether the installation has completed. For instance, the expected screens 204 may show a final screen in an operating system installation, such as an operating system desktop. If the received screens 206 match such an expected screen 204, the routine 500 proceeds from operation 538 to operation 532. If the operating system installation has not completed, the routine 500 proceeds from operation 538 to operation 520, described above.

At operation 532, the TCS 102 causes the SUT 104 to be powered off. The routine 500 then proceeds to operation 540 where the scripts 202 determine whether additional operating systems remain to be installed on the SUT 104. If so, the routine 500 proceeds to operation 503, described above for the installation of additional operating systems. If no more additional operating systems remain to be installed, the routine 500 proceeds from operation 540 to operation 542.

At operation 542, the scripts 202 cause the TCS 102 to email the error log 208 and any stored screens showing errors during the installation of operating systems on the SUT 104 to a system administrator. As discussed above, the TCS 102 may also make the error log 208 and the screens showing installation errors available to an administrator in another fashion. From operation 542, the routine 500 proceeds to operation 544, where it ends.

It should be appreciated that, according to embodiments, the scripts 202 may be configured to flash the firmware 106 as part of the operating system installation process described above. For instance, if errors are encountered during the installation of an operating system 104 on the SUT 104, the scripts 202 may cause a different version of the firmware 106 to be installed on the SUT 104. The scripts 202 may then attempt another installation of the same operating system under SUT 104. In this manner, different versions of the firmware 106 can be tested with an installation of the same or different operating systems.

It should also be appreciated that the operations described above with respect to FIGS. 5A-5B may be performed in a different order, additional operations might be performed, and some illustrated and described operations might not be performed. For instance, in one embodiment, the working drive 116 might first be formatted, then an operating system might be installed, and then an image might be taken of the working drive 116 and stored on the archive drive 118. In other embodiments, an image of the working drive 116 might first be taken, then the working drive 116 might be erased, then an operating system might be installed. It should be appreciated that the order of these operations might also be modified in other ways.

Figure 6:
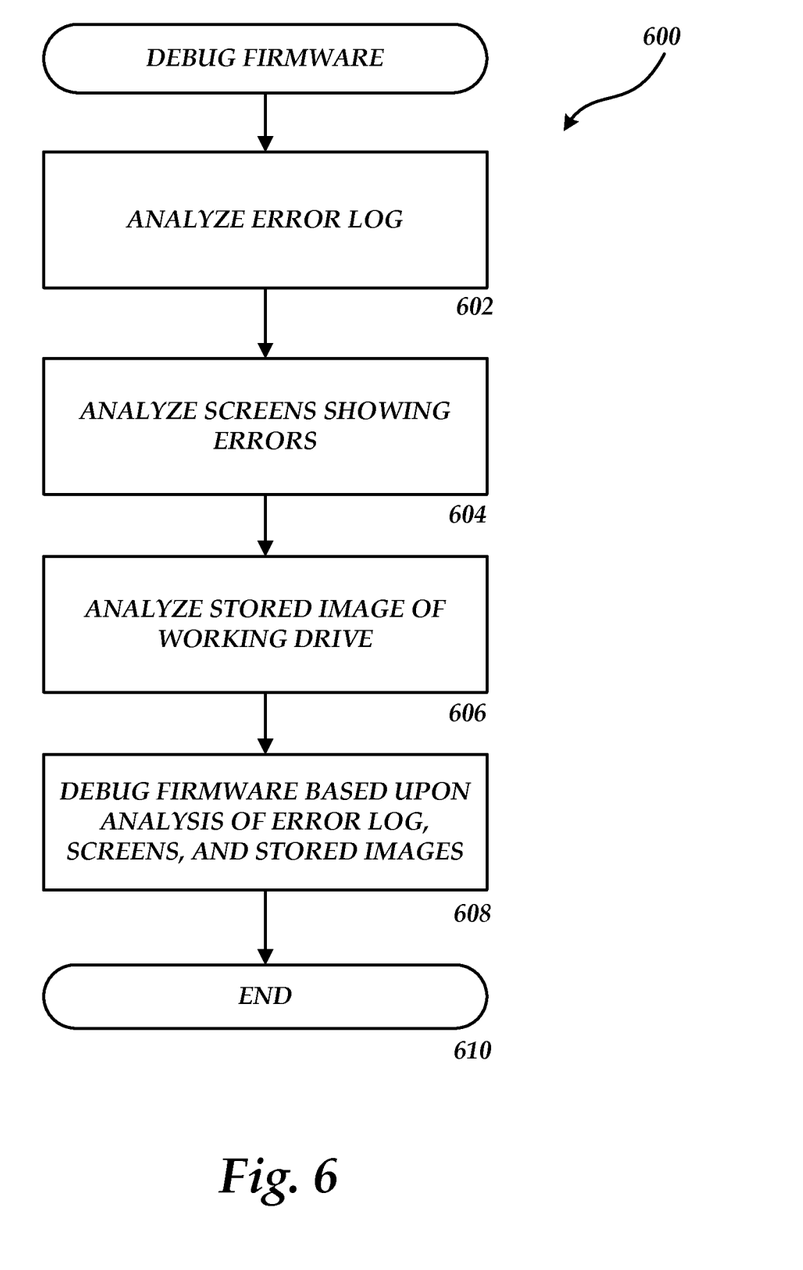
FIG. 6 is a flow diagram showing aspects of a process presented herein in one embodiment for debugging the operation of a computing system firmware that utilizes automated operating system installation.

FIG. 6 is a flow diagram showing aspects of a routine 600 presented herein in one embodiment for debugging the operation of a computing system firmware 106 that utilizes automated operating system installation. The routine 600 begins at operation 602, where the error the log 208 is analyzed to identify errors within the firmware 106. The routine the proceeds to operation 604, where the screens captured by the KVM/IP redirection device 114 at or around the time of an error during the installation of an operating system on the SUT 104 are also analyzed in attempt to identify errors within the firmware 106.

From operation 604, the routine 600 proceeds to operation 606, where the stored images of the operating system installations stored on the archive drive 118 are analyzed in attempt to identify errors within the firmware 106. If errors are identified at any of the operations 602, 604, or 606, described above, the routine 600 proceeds to operation 608 where the firmware 106 is modified in an attempt to eliminate the error within the firmware 106. As discussed briefly above, the processes described above for automated operating system installation may be repeated following a modification of the firmware 106 in order to determine whether the identified error has been eliminated from the firmware 106. From operation 608, the routine 600 proceeds to operation 610, where it ends.

Figure 7:
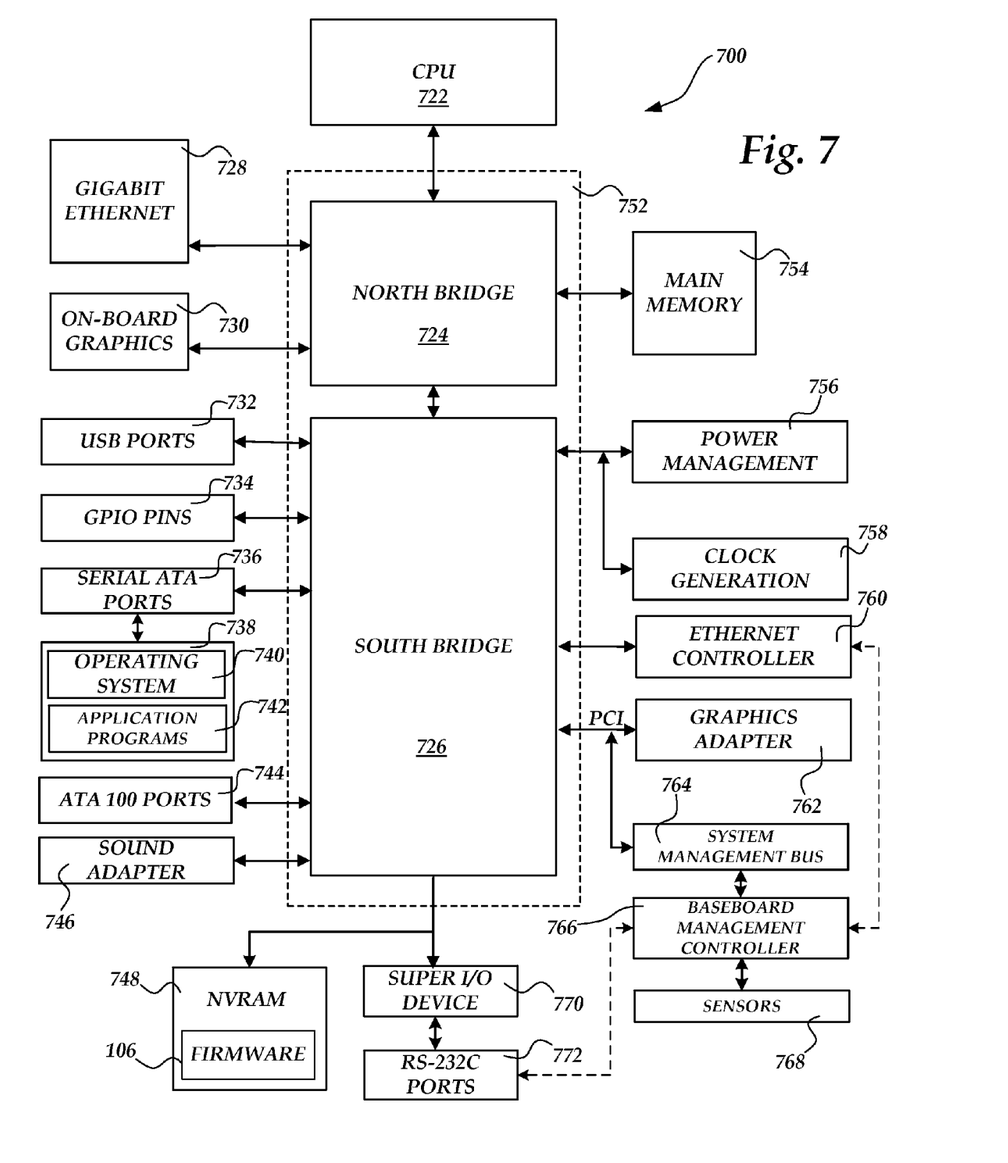
FIG. 7 is a computer architecture diagram showing an illustrative computer architecture that might be utilized to implement the various computing systems presented herein.

FIG. 7 is a computer architecture diagram showing an illustrative computer architecture that might be utilized to implement the various computing systems presented herein. FIG. 7 and the following discussion are intended to provide a brief, general description of one suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, scripts, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

As discussed briefly above, FIG. 7 shows an illustrative computer architecture that may be utilized to embody the various computing systems described herein. It should be appreciated that the computer architecture shown in FIG. 7 may be utilized to embody the TCS 102 or the SUT 104. The illustrative computer architecture shown in FIG. 7 is for a computer 700 that includes a baseboard, or "motherboard", which is a printed circuit board to which a multitude of components or devices may be connected by way of a system bus or other electrical communication path. In one illustrative embodiment, a CPU 722 operates in conjunction with a chipset 752. The CPU 722 is a central processor that performs arithmetic and logical operations necessary for the operation of the computer. The computer 700 may include a multitude of CPUs 722.

The chipset 752 includes a north bridge 724 and a south bridge 726. The north bridge 724 provides an interface between the CPU 722 and the remainder of the computer 700. The north bridge 724 also provides an interface to a random access memory ("RAM") used as the main memory 754 in the computer 700 and, possibly, to an on-board graphics adapter 730. The north bridge 724 may also include functionality for providing networking functionality through a gigabit Ethernet adapter 728. The gigabit Ethernet adapter 728 is capable of connecting the computer 700 to another computer via a network. Connections that may be made by the network adapter 728 may include LAN or WAN connections. LAN and WAN networking environments are commonplace in offices, enterprise-wide computer networks, intranets, and the Internet. The north bridge 724 is connected to the south bridge 726.

The south bridge 726 is responsible for controlling many of the input/output functions of the computer 700. In particular, the south bridge 726 may provide one or more universal serial bus ("USB") ports 732, a sound adapter 746, an Ethernet controller 760, and one or more general-purpose input/output ("GPIO") pins 734. The south bridge 726 may also provide a bus for interfacing peripheral card devices such as a graphics adapter 762. In one embodiment, the bus comprises a peripheral component interconnect ("PCI") bus. The south bridge 726 may also provide a system management bus 764 for use in managing the various components of the computer 700. Additional details regarding the operation of the system management bus 764 and its connected components are provided below.

The south bridge 726 is also configured to provide one or more interfaces for connecting mass storage devices to the computer 700. For instance, according to an embodiment, the south bridge 726 includes a serial advanced technology attachment ("SATA") adapter for providing one or more serial ATA ports 736 and an ATA 100 adapter for providing one or more ATA 100 ports 744. The serial ATA ports 736 and the ATA 100 ports 744 may be, in turn, connected to one or more mass storage devices storing an operating system 740 and application programs 742, such as the SATA disk drive 738. As known to those skilled in the art, an operating system 740 comprises a set of programs that control operations of a computer and allocation of resources. An application program is software that runs on top of the operating system software, or other runtime environment, and uses computer resources to perform application specific tasks desired by the user.

The mass storage devices connected to the south bridge 726, and their associated computer-readable media, provide non-volatile storage for the computer 700. Although the description of computer-readable media contained herein refers to a mass storage device, such as a hard disk or CD-ROM drive, it should be appreciated by those skilled in the art that computer-readable media can be any available media that can be accessed by the computer 700. By way of example, and not limitation, computer-readable media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 700.

A low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer-readable media such as a ROM or a flash memory such as the NVRAM 748 for storing a firmware 106 that includes program code containing the basic routines that help to start up the computer 700 and for transferring information between elements within the computer 700.

As described briefly above, the south bridge 726 may include a system management bus 764. The system management bus 764 may include a baseboard management controller ("BMC") 766. In general, the BMC 766 is a microcontroller that monitors operation of the computer system 700. In a more specific embodiment, the BMC 766 monitors health-related aspects associated with the computer system 700, such as, but not limited to, the temperature of one or more components of the computer system 700, speed of rotational components (e.g., spindle motor, CPU Fan, etc.) within the system, the voltage across or applied to one or more components within the system 700, and the available or used capacity of memory devices within the system 700. To accomplish these monitoring functions, the BMC 766 is communicatively connected to one or more components by way of the management bus 764. In an embodiment, these components include sensor devices for measuring various operating and performance-related parameters within the computer system 700.

The management bus 764 is used by the BMC 766 to request and/or receive various operating and performance-related parameters from one or more components, which are also communicatively connected to the management bus 764. For instance, in one embodiment, the management bus 764 may communicatively connect the BMC 766 to a CPU temperature sensor and a CPU fan (not shown in FIG. 7), thereby providing a means for the BMC 766 to monitor and/or control operation of these components. The BMC 766 may also include sensors 768 connected directly thereto.

The serial ports 772 and the Ethernet controller 760 may be utilized to establish a connection with the BMC 766. Through the use of the BMC 766, the sensors 768, and the system management bus 764, the computer 700 may collect the management data 112 discussed above and make this data available to requesting programs. The BMC 766 may also provide functionality for setting aspects of the management data 112 as discussed above, such as for instance resetting the computer 700 or setting the power state of the computer 700.

It should be appreciated that the software components described herein may, when loaded into the CPU 722 and executed, transform the CPU 722 and the overall computer 700 from a general-purpose computing system into a special-purpose computing system customized to facilitate the functionality presented herein. The CPU 722 may be constructed from any number of transistors or other discrete circuit elements, which may individually or collectively assume any number of states. More specifically, the CPU 722 may operate as a finite-state machine, in response to executable instructions contained within the software modules disclosed herein. These computer-executable instructions may transform the CPU 722 by specifying how the CPU 722 transitions between states, thereby transforming the transistors or other discrete hardware elements constituting the CPU 722.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon, such as the management data 112.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the computer 700 may comprise other types of computing devices, including hand-held computers, embedded computer systems, personal digital assistants, and other types of computing devices known to those skilled in the art. It is also contemplated that the computer 700 may not include all of the components shown in FIG. 7, may include other components that are not explicitly shown in FIG. 7, or may utilize an architecture completely different than that shown in FIG. 7.

Based on the foregoing, it should be appreciated that concepts and technologies for automated operating system installation have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus for use in an automated operating system installation system, the apparatus comprising:
   a universal serial bus (USB) hub connected to a system under test (SUT) and a plurality of multiplexers, each of the plurality of multiplexers configured for connection to a plurality of mass storage devices; and
   a USB-to-serial device connected to a test control system (TCS) and the plurality of multiplexers, wherein the TCS is configured for coordinating automatic installation of a plurality of operating systems on the SUT, the USB-to-serial device configured to:
   receive a first control signal from the TCS and configure the plurality of multiplexers based upon the first control signal to establish a connection between a first of the plurality of mass storage devices and the USB hub, thereby enabling a connection between the first of the plurality of mass storage devices and the SUT, the first of the plurality of mass storage devices containing an installer program for a first operating system; and
   in response to a determination by the TCS that the installer program for the first operating system has completed installation of the first operating system on the SUT, the determination being based on information received from the SUT, receive a second control signal from the TCS and configure the plurality of multiplexers based upon the second control signal to establish a connection between a second of the plurality of mass storage devices and the USB hub, thereby enabling a connection between the second of the plurality of mass storage devices and the SUT, the second of the plurality of mass storage devices containing a disk drive utility program.

2. The apparatus of claim 1, further comprising a plurality of external USB ports, each of the plurality of external USB ports being connected to one of the plurality of mass storage devices, wherein the first control signal selects an external USB port connected to the first mass storage device and electrically connects the selected external USB port and the USB hub, and wherein the USB hub is configured to route signals from the selected external USB port to the SUT.

3. The apparatus of claim 1, further comprising a plurality of external USB ports, each of the plurality of external USB ports being connected to one of the plurality of mass storage devices, wherein the second control signal selects an external USB port connected to the second mass storage device and electrically connects the selected external USB port and the USB hub, and wherein the USB hub is configured to route signals from the selected external USB port to the SUT.

4. The apparatus of claim 1, wherein the USB-to-serial device is further configured to in response to determinations by the TCS that the disk drive utility program has completed execution and that another operating system remains to be installed on the SUT, receive a third control signal from the TCS and configure the plurality of multiplexers based upon the third control signal to establish a connection between a third of the plurality of mass storage devices and the USB hub, thereby enabling a connection between the third of the plurality of mass storage devices and the SUT, the third of the plurality of mass storage devices containing an installer program for a second operating system.

5. The apparatus of claim 4, further comprising a plurality of external USB ports, each of the plurality of external USB ports being connected to one of the plurality of mass storage devices, wherein the third control signal selects an external USB port connected to the third mass storage device and electrically connects the selected external USB port and the USB hub, and wherein the USB hub is configured to route signals from the selected external USB port to the SUT.

6. The apparatus of claim 1, further comprising a power input port for providing a power signal to at least one of the plurality of multiplexers, the USB hub and the USB-to-serial device.

* * * * *